(12) United States Patent
Chai et al.

(10) Patent No.: US 10,640,596 B2
(45) Date of Patent: May 5, 2020

(54) RUBBER POLYMER, GRAFT COPOLYMER, PREPARATION METHODS THEREFOR, AND IMPACT RESISTANT AND HEAT RESISTANT RESIN COMPOSITION

(71) Applicant: LG CHEM, LTD., Seoul (KR)

(72) Inventors: Joo Byung Chai, Daejeon (KR); Yu Sung Jung, Daejeon (KR); Eun Seon Park, Daejeon (KR); Tae Young Jeon, Daejeon (KR); Young Min Kim, Daejeon (KR); Jin Ho Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 90 days.

(21) Appl. No.: 15/923,800

(22) Filed: Mar. 16, 2018

(65) Prior Publication Data

US 2018/0201715 A1    Jul. 19, 2018

Related U.S. Application Data

(62) Division of application No. 14/893,889, filed as application No. PCT/KR2014/009196 on Sep. 30, 2014, now Pat. No. 9,951,168.

(30) Foreign Application Priority Data

Sep. 30, 2013  (KR) .................. 10-2013-0116089
Sep. 5, 2014   (KR) .................. 10-2014-0118560

(51) Int. Cl.
| | | |
|---|---|---|
| *C08F 236/10* | (2006.01) | |
| *C08L 25/16* | (2006.01) | |
| *C08L 9/00* | (2006.01) | |
| *C08F 279/04* | (2006.01) | |
| *C08L 25/12* | (2006.01) | |
| *C08L 51/04* | (2006.01) | |

(52) U.S. Cl.
CPC .......... *C08F 236/10* (2013.01); *C08F 279/04* (2013.01); *C08L 9/00* (2013.01); *C08L 25/12* (2013.01); *C08L 25/16* (2013.01); *C08L 51/04* (2013.01); *C08L 2201/08* (2013.01)

(58) Field of Classification Search
CPC ...... C08F 236/10; C08F 25/12; C08F 279/04; C08F 51/04; C08L 25/12; C08L 51/04
See application file for complete search history.

(56) References Cited

U.S. PATENT DOCUMENTS

| 4,639,488 A * | 1/1987 | Schuette ................. C08L 51/04 |
|---|---|---|
| | | 523/201 |
| 5,079,294 A * | 1/1992 | Yang .................. C08G 73/0655 |
| | | 525/64 |

FOREIGN PATENT DOCUMENTS

| CN | 1230555 A | 10/1999 |
|---|---|---|
| CN | 1784428 A | 6/2006 |
| KR | 10-2004-0011905 A | 2/2004 |
| KR | 10-0441799 B1 | 7/2004 |
| KR | 10-2005-0038453 A | 4/2005 |
| KR | 10-2012-0004261 A | 1/2012 |
| KR | 10-2013-0087664 A | 8/2013 |

OTHER PUBLICATIONS

International search report for PCT/KR2014/009196 filed on Sep. 30, 2014.
Office Action from Chinese Patent Office for Application No. 201480020965.5, dated Nov. 22, 2016.

* cited by examiner

*Primary Examiner* — Jeffrey C Mullis

(57) ABSTRACT

Disclosed are a rubber polymer, a graft copolymer, methods of preparing the same, and an impact and heat resistant resin composition. According to the present invention, provided are rubber latex and a graft copolymer which may realize a product having superior impact resistance, heat resistance and chemical resistance by adding a specific crosslinking regulator to the rubber polymer, methods of preparing the same, and an impact and heat resistant resin composition.

10 Claims, No Drawings

RUBBER POLYMER, GRAFT COPOLYMER, PREPARATION METHODS THEREFOR, AND IMPACT RESISTANT AND HEAT RESISTANT RESIN COMPOSITION

CROSS REFERENCE TO RELATED APPLICATIONS

The present application is a divisional of and claims priority to U.S. application Ser. No. 14/893,889 filed Nov. 24, 2015, which is a U.S. National Stage of International Patent Application No. PCT/KR2014/009196 filed Sep. 30, 2014, which claims priority to Korean application number KR 10-2013-0116089, filed on Sep. 30, 2013, and Korean application number KR 10-2014-0118560, filed on Sep. 5, 2014, which are incorporated by reference in their entirety.

TECHNICAL FIELD

The present invention relates to a rubber polymer, a graft copolymer, methods of preparing the same, and an impact and heat resistant resin composition. More particularly, the present invention relates to rubber latex and a graft copolymer which may realize a product having superior impact resistance, heat resistance and chemical resistance by adding a specific crosslinking regulator to the rubber polymer, methods of preparing the same, and an impact and heat resistant resin composition.

BACKGROUND ART

As representative examples of rubber-reinforced graft copolymers, particularly rubber-reinforced graft copolymers prepared through emulsion polymerization, there are ABS, MBS, ASA, ATM, etc. These are prepared by graft-copolymerizing a variety of monomers, while considering dispersibility of a matrix phase, to an outer shell of a core of a rubber prepared through conventional emulsion polymerization. In particular, ABS is prepared by graft-copolymerizing a styrene-acrylonitrile copolymer (PSAN) to an outer shell of poly butadiene latex as a core. In particular, ABS products thereamong have superior impact resistance and heat resistance, process properties such as chemical resistance, and superior appearance properties, thus being broadly used as exterior materials of vehicles, or materials of housings of home appliances and toys.

In particular, in order to produce ABS having superior thermal properties (heat deflection resistance, HDT), namely, heat resistance as in materials of vehicles, a resin (heat resistant SAN) having a high glass transition temperature (Tg) is prepared through emulsion polymerization or solution polymerization, and a final product may be prepared by mixing and melt-blending such that a rubber-reinforced graft copolymer in which SAN is graft-copolymerized through emulsion polymerization has constant rubber content.

As representative monomers used in a heat-resistant resin having high glass transition temperature, there are styrene-based derivatives such as α-methyl styrene (AMS) and imide based monomers such as N-phenylmaleinimide (PMI), etc. These exhibit enhanced heat resistance as a ratio of AMS used in a resin increases, but there are many problems in a polymerization step to prepare a resin.

Accordingly, in order to address problems due to application of AMS, a variety of methods have been tried. In U.S. Pat. No. 2,908,666, it was tried to enhance impact resistance, environmental stress crack resistance (ESCR) and heat resistance, by grafting an AMS monomer and an acrylonitrile monomer to polydiene rubber latex, but polymerization took a long time, information regarding a polymerization conversion rate was not described, and it is difficult to recognize that superior impact strength was realized.

In addition, in U.S. Pat. No. 5,266,642, polymerization was performed in the presence or absence of a rubber polymer to increase polymerization speed, when an AMS based polymer was prepared through emulsion polymerization, but rubber polymer content was very low, polymerization conversion rate was not high and, particularly, impact resistance and thermal properties of a resin were not referred.

In addition, U.S. Pat. No. 4,774,287 discloses a method wherein superior thermal properties are exhibited at high temperature and AMS decomposition in high process temperature is prevented, but does not describe superior polymerization conversion rate, reaction time, or impact resistance.

Accordingly, there is still a need for rubber polymer and graft copolymer technology which may decrease polymerization time while effectively providing impact resistance, thermal properties, etc.

DISCLOSURE

Technical Problem

Therefore, the present invention has been made in view of the above problems, and it is one object of the present invention to provide a rubber polymer comprising a specific crosslinking regulator in order to realize a product having superior impact resistance, heat resistance and chemical resistance.

Technical Solution

In accordance with one aspect of the present invention, provided is a rubber polymer as an emulsion polymer of a diene-based monomer, the rubber polymer comprising a crosslinking regulator in an amount of 5% to 20% by weight based on 100% by weight in a total of monomers constituting the polymer.

In accordance with another aspect of the present invention, provided is a method of preparing a rubber polymer using emulsion polymerization, wherein a prepared crosslinking regulator is comprised in an amount of 5% to 20% by weight based on 100% by weight in a total of monomers constituting the rubber polymer.

In accordance with another aspect of the present invention, provided is a method of preparing a graft copolymer from a rubber polymer, wherein, as the rubber polymer, a crosslinking regulator-comprising rubber polymer obtained according to the method described above is used.

In accordance with yet another aspect of the present invention, provided is an impact and heat resistant resin composition comprising a graft copolymer and a heat resistant thermoplastic resin, wherein the graft copolymer comprises a graft copolymer comprising the crosslinking regulator-comprising rubber polymer obtained according to the method described above in an amount of 50% to 80% by weight based on 100% by weight of the composition.

Advantageous Effects

As apparent from the fore-going, the present invention advantageously provides rubber latex and a graft copolymer which may realize a product having superior impact resistance, heat resistance and chemical resistance by adding a specific crosslinking regulator to the rubber polymer, methods of preparing the same, and an impact and heat resistant resin composition.

BEST MODE

Hereinafter, the present invention is described in detail.

A rubber polymer according to the present invention is an emulsion polymer of a diene-based monomer, and the rubber polymer comprises a crosslinking regulator in an amount of 5% to 20% by weight based on 100% by weight in a total of monomers constituting the polymer.

In an embodiment, a particle diameter of the crosslinking regulator may be located in 50% or less based on 100% of a target particle diameter of the polymer.

The crosslinking regulator may be a polymer of crosslinking control monomers. In an embodiment, the crosslinking control monomer may be one or mores selected from vinyl aromatic monomers, vinyl cyan based monomers, acrylate based monomers and unsaturated carboxylic acid based monomers.

In an embodiment, in a method of preparing a rubber polymer using emulsion polymerization, a prepared crosslinking regulator may be comprised in an amount of 5% to 20% by weight based on 100% by weight in a total of monomers constituting the rubber polymer.

In a specific embodiment, the emulsion polymerization may comprise inputting 45% to 60% by weight of a diene-based monomer and 5% to 20% by weight of a crosslinking control monomer based on 100% by weight in a total of monomers constituting the rubber polymer, and initiating the emulsion polymerization; and performing emulsion polymerization until a polymerization conversion rate becomes 90% to 98% while continuously inputting 20% to 50% by weight of the diene-based monomer until a polymerization conversion rate becomes 70% to 80% when a conversion rate of the polymerization is 40% to 60%.

According to the method of the present invention, a rubber polymer having a gel content of 70% to less than 95% and a swelling index of 15 to less than 25 under a polymerization conversion rate of 90% to 95% may be prepared.

When a graft copolymer is prepared from a rubber polymer in the graft copolymerization method according to the present invention, a crosslinking regulator-comprising rubber polymer described above as the rubber polymer is used.

In an embodiment, 20% to 50% by weight of one or more monomers selected from styrene-based monomers, vinyl cyanide monomers and acrylic acid ester monomers may be added to 50% to 80% by weight of the crosslinking regulator-comprising rubber polymer, and graft-copolymerized with rubber particles.

The impact and heat resistant resin composition according to the present invention comprises a graft copolymer and a heat resistant thermoplastic resin, and a graft copolymer comprising the crosslinking regulator-comprising rubber polymer, as the graft copolymer, obtained according to the method described above is comprised in an amount of 50% to 80% by weight based on 100% by weight of the composition.

Hereinafter, the rubber latex and the method of preparing the same are described in more detail. Steps described in the present invention are provided merely for illustration, the steps are not needed to be definitely classified when polymerization is carried out, and polymerization may be carried out through continuous polymerization.

A) Rubber Polymer and Preparation Thereof

A composition of a rubber polymer and a method of preparing the same proposed in the present invention are as follows.

In particular, the rubber polymer according to the present invention is an emulsion polymer of a diene-based monomer and comprises a crosslinking regulator.

For reference, the expression "crosslinking regulator" used as the present invention means, so long as not specified otherwise, an agent, a (co)polymer, etc., which may control a high crosslinking density of a rubber polymer, thus lowering the same.

In addition, the expression "comprising a crosslinking regulator" means, so long as not specified otherwise, that a crosslinking regulator is comprised in a specific location inside a rubber polymer.

In an embodiment, the amount of the crosslinking regulator may be 5% to 20% by weight, 5% to 15% by weight, or 10% to 15%, based on 100% by weight in the total of monomers constituting the polymer.

In an embodiment, a particle diameter of the crosslinking regulator locates in a point of 50% or less, 10% to 50%, 20% to 45%, or 25% to 40%, based on 100% of a target particle diameter of the polymer. Within the range, a swelling index and impact strength may be increased.

In an embodiment, the crosslinking regulator may be a polymer or copolymer of crosslinking control monomers.

In a specific embodiment, the crosslinking control monomer may be one or mores selected from vinyl aromatic monomers, vinyl cyan based monomers, acrylate based monomers and unsaturated carboxylic acid based monomers.

As needed, at least one selected from divinyl benzene, aryl methacrylate, diallyl phthalate, ethylene glycol diacrylate, triethylene diacrylate, tetraethylene diacrylate, polyethyleneglycol diacrylate, and polyethyleneglycol dimethacrylate may be used in an amount of 0.5 to 2 parts by weight, based on the total of monomers used in the present invention.

In addition, the expression "target particle diameter of a polymer" may mean, so long as not specified otherwise, a rubber polymer average diameter of 1000 to 3500 Å, 2000 to 3500 Å, 3000 to 3500 Å or 3000 to 3300 Å.

In a specific embodiment, the rubber polymer may be prepared into a particle size of 3000 to 3500 Å. As needed, the rubber polymer may be prepared into a particle size of 500 to 1500 Å and then may be directly used. Alternatively, the 500 to 1500 Å-size rubber polymer particles may be enlarged to 3000 to 3500 Å through coagulation.

The rubber polymer may be prepared by a variety of methods. In an embodiment, the rubber polymer may be prepared by the following method.

First, based on 100% by weight in the total of monomers constituting the rubber polymer, 45% to 60% by weight of a diene-based monomer and 5% to 20% by weight of a crosslinking control monomer are input, and emulsion polymerization is initiated.

Emulsion polymerization is carried out until a polymerization conversion rate becomes 90% to 95% while continuously inputting 20% to 50% by weight of the diene-based monomer until a polymerization conversion rate becomes 70% to 80% when a conversion rate of the polymerization is 40% to 60%.

In an embodiment of the continuously inputting, the diene-based monomer may be input at a rate of 1 to 10 parts/hr or 1 to 3 parts/hr.

In an embodiment of the initiating of the emulsion polymerization, the diene-based monomer is added batchwise, and the crosslinking control monomer mixed with an additive comprising an emulsifier is input, preferably followed by maintaining under a nitrogen atmosphere for 30 minutes to 1 hour. In this regard, it may be more preferable to maintain pH 9 to 11.

In an embodiment, the diene-based monomer may be one or more selected from among 1,3-butadiene, isoprene, 2,3-dimethyl-1,3-butadiene, 2-methyl-1,3-pentadiene, 2,3-dimethyl-1,3-pentadiene, and 2-phenyl-1,3-butadiene.

In an embodiment, the crosslinking control monomer may comprise at least one styrene-based monomer selected from styrene, α-methylstyrene, α-methyl-4-butylstyrene, 4-phenyl styrene, 2,5-dimethylstyrene, 2-methylstyrene, α-methyl-3,5-di-t-butylstyrene, α-methyl-3,4,5-trimethylstyrene, α-methyl-4-benzylstyrene and α-methyl-4-cyclohexylstyrene.

In another embodiment, the crosslinking control monomer may comprise one or more acrylic acid ester based monomers selected from methyl methacrylate, methyl acrylate, ethylacrylate, butylacrylate and 2-ethylhexyl acrylate.

In another embodiment, the crosslinking control monomer may comprise one or more vinyl cyanide monomers selected from acrylonitrile, methacrylonitrile, and ethacrylonitrile.

In another embodiment, the crosslinking control monomer may comprise one or more unsaturated carboxylic acids selected from acrylic acid, maleic acid, methacrylic acid, itaconic acid and fumaric acid.

In an embodiment, the initiating of the emulsion polymerization may be a step wherein a hydrophilic persulfate-based initiator or a hydrophobic hydroperoxide based initiator, an anionic emulsifier or a nonionic emulsifier, a mercaptan based molecular weight controller and an electrolyte (emulsifier-initiator-molecular weight controller-electrolyte solution) are added.

In a specific embodiment, after inputting the emulsifier-initiator-molecular weight controller-electrolyte solution, or after inputting the solution batchwise and then stirring for 0.1 to 2 hours or 0.5 to 1 hours, reaction may be carried out while elevating reaction temperature to 55 to 65° C. or 58 to 65° C. In an embodiment, reaction time may be 4.5 to 5.5 hours or 4.8 to 5.2 hours.

As the emulsifier, an emulsifier having a conventional sulfonate terminal group, an emulsifier having a carboxylic acid terminal, etc. may be used. A nonionic emulsifier and a reactive emulsifier may be used alone or together.

In an embodiment, as the initiator, a persulfate-based initiator having strong hydrophilic properties, e.g., a thermal decomposition initiator such as potassium persulfate, ammonium persulfate, or sodium persulfate, may be used. A hydroperoxide based initiator such as hydrophobic diisopropylbenzene hydroperoxide, cumene hydroperoxide, tertiary butyl hydroperoxide, etc. may be used with a conventionally applicable oxidation-reduction catalyst such as ferrous sulfate, dextrose, sodium pyrophosphate, sodium sulfite, etc. However, in a seed polymerization step and in the case of a diene-based monomer, it is preferable to use an initiator having strong hydrophilic properties. In addition, in a step wherein an aromatic or non-aromatic monomer having an unsaturated double-bond is applied, it is preferable to use a hydrophobic initiator alone or with an oxidation-reduction catalyst.

In an embodiment, when the diene-based monomer and the crosslinking control monomer are input and the diene-based monomer is continuously input, one or more hydrophilic initiator types selected from the group consisting of potassium persulfate, ammonium persulfate and sodium persulfate may be respectively used.

Upon application of the hydrophilic initiator, one or more oxidation-reduction catalyst types selected from the group consisting of ferrous sulfate, dextrose, sodium pyrophosphate and sodium sulfite may be used together.

In an embodiment, as the electrolyte, KCl, $Na_2CO_3$, $CaCO_3$, $NaHSO_4$, etc. may be used alone or as a mixture of two or more thereof.

In an embodiment, as the molecular weight controller, mercaptans such as n-dodecyl mercaptan, n-decyl mercaptan or t-dodecyl mercaptan and a molecular weight controller such as an α-methyl styrene dimer used in conventional emulsion polymerization may be used.

In an embodiment, when a conversion rate of the polymerization is 40% to 60%, 50% to 60% or 55% to 60%, polymerization may be carried out by continuously inputting the diene-based monomer.

In an embodiment, the continuously inputting may be carried out for 5 to 12 hours or 6 to 10 hours.

During the continuously inputting, an anionic emulsifier or a nonionic emulsifier, and a hydrophilic persulfate-based initiator or a hydrophobic hydroperoxide based initiator (emulsifier-initiator solution) may be input.

The emulsifier-initiator solution may be input (batchwise) after 1.5 to 2.5 hours or 1.8 to 2.2 hours from a time point of the continuously inputting.

After terminating the continuously inputting, the anionic emulsifier or the nonionic emulsifier may be additionally added.

For reference, a single input amount of the emulsifier may be 0.1 to 1 part by weight or 0.2 to 0.5 parts by weight based on 100 parts by weight in the total of monomers constituting the rubber polymer.

A single input amount of the initiator may be 0.1 to 5 parts by weight or 0.1 to 1 part by weight based on 100 parts by weight in the total of monomers constituting the rubber polymer.

The amount of the molecular weight controller may be 0.1 to 1 part by weight or 0.2 to 0.5 parts by weight based on 100 parts by weight in the total of monomers constituting the rubber polymer.

The electrolyte may comprise 0.1 to 5 parts by weight or 0.1 to 1 part by weight based on 100 parts by weight in the total of monomers constituting the rubber polymer.

Temperature may be elevated to 70 to 85° C. or 75 to 80° C. after inputting the emulsifier-initiator solution, and reaction may be carried out for 4 to 6 hours or 4.5 to 5.5 hours.

In an embodiment, one or more oxidation-reduction catalysts (oxidation-reduction catalyst solution) selected from ferrous sulfate, dextrose, sodium pyrophosphate and sodium sulfite may be added or may be added batchwise after the reaction, and reaction is terminated.

In another embodiment, polymerization may be carried out by adding batchwise 0.1 to 1.5 parts by weight of the emulsifier, 0.01 to 2.0 parts by weight of the polymerization initiator, 0.01 to 0.4 parts by weight of the molecular weight controller, and 0.1 to 2.0 parts by weight of the electrolyte to a mixture of 50 to 60 parts by weight of the diene-based monomer and 10 to 15 parts by weight of the crosslinking control monomer, and a rubber polymer comprising the crosslinking regulator may be obtained by continuously adding 35 to 40 parts by weight of the diene-based monomer when a particle size is 1500 to 2500 Å and a polymerization conversion rate is 40% to 60%.

In an embodiment, the rubber polymer according to the present invention may be obtained as a latex type.

In an embodiment, a solid content in the latex may be 35 to 60% by weight.

According to the method, a rubber polymer having a gel content of 70% to less than 95% or 70% to 75% and a swelling index of 15 to less than 25 or 15 to 20 under a polymerization conversion rate of 90% to 98% or 93 to 96% may be prepared.

For reference, the swelling index corresponds to an indirect index for crosslinking density of the present invention. Since a product having a low swelling index has a high crosslinking density, impact strength of a subsequent impact and heat resistant resin composition is deteriorated and a product having a high swelling index exhibits enhanced impact strength (See Tables 1 and 3 below).

B) Preparation of Graft Copolymer

A rubber polymer prepared according to the method of (A) is prepared into a graft copolymer through emulsion polymerization, and detailed description thereof is as follows.

In an embodiment, a graft copolymer comprising the rubber polymer may be prepared as follows.

That is, 20% to 50% by weight of one or more monomer selected from a styrene-based monomer, a vinyl cyanide monomer and a (methyl)acrylic acid ester monomer is added to 50% to 80% by weight of obtained crosslinking regulator-comprising rubber polymer, and is graft-copolymerized with rubber particles through emulsion polymerization.

In an embodiment, one or more monomers selected from styrene-based monomer, vinyl cyanide monomer and acrylic acid ester monomer may be used in an amount of 10% to 40% by weight based on 100% by weight in the total of the monomers (except for the content of the rubber polymer).

As a styrene-based monomer, a vinyl cyanide monomer and an acrylic acid ester monomer, those described above may be used.

A method of preparing the graft copolymer of the present invention through emulsion polymerization is not specifically limited. In an embodiment, based on 50% to 80% by weight of the rubber polymer, 20% to 50% by weight of the monomer to form a graft copolymer is input with an emulsifier, a molecular weight controller, a graft supplement and an initiator, and reaction is continued until a reaction conversion rate becomes 95 to 99% or 97% to 99% and then reaction is terminated.

In an embodiment, as the emulsifier, a carboxylate-type and adsorption-type emulsifier such as rosin-acid potassium and fatty acid potassium, a sulfonate based emulsifier such as sodium lauric sulfate or alkyl benzene sulfonate, or a reactive emulsifier may be used alone or as a mixture thereof.

When the graft copolymer is prepared, as the molecular weight controller, a molecular weight controller such as n-dodecyl mercaptan, n-decyl mercaptan, t-dodecyl mercaptan and an α-methyl styrene dimer may be used. In particular, it is preferable to use 0.2 to 1.0 parts by weight of tertiary dodecyl mercaptan. Here, the "parts by weight" is based on 100 parts by weight in the total of the rubber polymer and the monomer.

The initiator may be used in an amount of 0.01 to 1 part by weight and the initiator type is not specifically limited. In an embodiment, when a peroxide initiator such as tertiary butyl hydroperoxide, cumene hydroperoxide or diisopropylbenzene hydroperoxide and an oxidation-reduction catalyst are used together, impact resistance and latex stability may be advantageously secured upon graft copolymerization.

In addition, when the graft copolymer is prepared, each monomer or a mixture of monomers is directly added to a reactor or a monomer emulsion prepared by mixing an emulsifier, water and an initiator may be added to a reactor. Selectively, 0% to 20% by weight or 1% to 20% by weight of the monomers based on 100% by weight in the total of the monomers may be input batchwise at an initial reaction step and the remainder may be input continuously. In addition, the total amount of the monomers may be input continuously or batchwise three or four times at a constant time interval.

An antioxidant and a thermostabilizer are added to a reacted graft copolymer, and then coagulation is carried out using acid such as sulfuric acid, hydrochloric acid, phosphoric acid or acetic acid, or a metal salt such as calcium chloride, sulfuric acid magnesium, or sulfuric acid aluminum, whereby a solid may be isolated. The isolated solid is washed, dehydrated and dried, and thus, it may be prepared into a powder type. Such a powder-type graft copolymer may be generally mixed with a thermoplastic resin copolymer prepared through solution polymerization.

According to the present invention, a graft copolymer having a solid content of 0.1% or less of solid and a graft ratio of 35% to 50% may be provided under a polymerization conversion rate of 96% to 99%.

In an embodiment, the graft copolymer may be an acrylonitrile-butadiene-styrene (ABS) based resin.

An obtained final polymer has a particle size of 3000 to 3500 Å and the content of a polymerized solid in the polymer is 0.01% or less based on the total content of an input solid.

C) Provision of Impact and Heat Resistant Resin Composition

The graft copolymer prepared the method described above is conventionally melted and mixed through extrusion with a heat resistant thermoplastic resin, and pelletized. Finally, the graft copolymer is prepared into an impact and heat resistant resin. In this case, as a heat resistant thermoplastic resin, a resin such as an α-methylstyrene-acrylonitrile-styrene copolymer (AMS-SAN), an acrylonitrile-styrene copolymer (SAN), acrylonitrile-styrene-methyl methacrylate (MS), polycarbonate (PC), polybutylene terephthalate (PBT) or polyvinyl chloride (PVC) may be used.

In a specific embodiment, the heat resistant thermoplastic resin may be comprised in an amount of 20% to 50% by weight based on the composition.

In another embodiment, the heat resistant thermoplastic resin may be a mass polymer of 65 to 80% by weight of one or more styrene-based monomers selected from styrene, α-methylstyrene, α-methyl-4-butylstyrene, 4-phenyl styrene, 2,5-dimethylstyrene, 2-methylstyrene, α-methyl-3,5-di-t-butylstyrene, α-methyl-3,4,5-trimethylstyrene, α-methyl-4-benzylstyrene and α-methyl-4-cyclohexylstyrene, and 20% to 35% by weight of one or more vinyl cyanide monomers selected from acrylonitrile, methacrylonitrile and ethacrylonitrile.

In another embodiment, the heat resistant thermoplastic resin may be a mass polymer of one or more 64% to 75% by weight of styrene-based derivatives selected from α-methylstyrene, α-methyl-4-butylstyrene, 4-phenyl styrene, 2,5-dimethylstyrene, 2-methylstyrene, α-methyl-3,5-di-t-butylstyrene, α-methyl-3,4,5-trimethylstyrene, α-methyl-4-benzylstyrene and α-methyl-4-cyclohexylstyrene, 20% to 35% by weight one or more vinyl cyanide monomers selected from acrylonitrile, methacrylonitrile and ethacrylonitrile, and 1% to 5% by weight of styrene.

In addition, when such graft copolymers are melt-molded through extrusion and injection with the heat resistant thermoplastic resin, a lubricant, thermostabilizer and other additives for processing may be added, and types of the added ingredients are not specifically limited.

The impact and heat resistant resin prepared according to the method exhibits enhanced impact resistance and superior colorability, when compared with conventional preparation methods.

Although the preferred embodiments of the present invention are disclosed for illustrative purposes, those skilled in the art will appreciate that various modifications, additions and substitutions are possible, without departing from the scope and spirit of the invention as disclosed in the accompanying claims.

EXAMPLE

Preparation of Rubber Polymer

Example 1: Preparation of Latex A1

100 parts by weight of deionized water was input to a pressurized reactor substituted with nitrogen atmosphere and then monomer summarized in Table 1 was added thereto. 0.5 parts by weight of rosin-acid potassium, 0.3 parts by weight of tertiary dodecyl mercaptan, 1.0 part by weight of potassium carbonate and 0.1 parts by weight of potassium persulfate were added thereto at room temperature, followed by stirring for one hour.

Subsequently, reaction was carried out for five hours while elevating reaction temperature to 65° C., and when a polymerization conversion rate reached 60%, monomer B summarized in Table 1 was continuously input over seven hours thereto. 0.5 parts by weight of rosin-acid potassium and 0.1 parts by weight of potassium persulfate were added thereto two hours after the continuous input. After terminating the continuously input, 0.2 parts by weight of rosin-acid potassium was additionally added. In this regard, reaction temperature was 70° C.

Subsequently, reaction temperature was elevated to 80° C. and reaction was maintained for five hours. In this case, a solution including 0.0005 parts by weight of ferrous sulfide, 0.05 parts by weight of dextrose, 0.04 parts by weight of sodium pyrophosphate and 2 parts by weight of deionized water was added batchwise, and reaction was terminated. In this regard, a polymerization conversion rate and properties are summarized in Table 1 below.

Example 2: Preparation of Latex A2

The same process as in Example 1 was repeated, except that monomers A and B were substituted as summarized in Table 1 below. In this regard, a polymerization conversion rate and properties are summarized in Table 1 below.

Example 3: Preparation of Latex A3

The same process as in Example 1 was repeated, except that monomers A and B were substituted as summarized in Table 1 below. In this regard, a polymerization conversion rate and properties are summarized in Table 1 below.

Comparative Example 1: Preparation of Latex B1

The same process as in Example 1 was repeated, except that monomers A and B were substituted as summarized in Table 1 below and α-methylstyrene (AMS) was not used in a core and a shell. In this regard, a polymerization conversion rate and properties are summarized in Table 1 below.

Comparative Example 2: Preparation of Latex B2

The same process as in Example 1 was repeated, except that monomers A and B were substituted as summarized in Table 1 below, and α-methylstyrene (AMS) was added when addition of 1,3-diene (BD) was completed and shortly before temperature was elevated. In this regard, a polymerization conversion rate and properties are summarized in Table 1 below.

Comparative Example 3: Preparation of Latex B3

The same process as in Example 1 was repeated, except that monomers A and B were substituted as summarized in Table 1 below. In this regard, a polymerization conversion rate and properties are summarized in Table 1 below.

Property Measurement Method

Polymerization conversion rate: 2 g of the prepared latex at each step was dried in a 150° C. hot air dryer for 15 minutes and then the weight thereof was measured. A total solid content (TSC) was found and then a polymerization conversion rate was calculated as follows.

Latex particle size measurement: A weight-average particle size was measured using Nicomp equipment.

Gel content measurement: Methanol was added to the prepared rubber latex, sulfuric acid was precipitated, and washing/drying was carried out. Solid (A) as a rubber ingredient was extracted, and then, toluene was added thereto, followed by standing for 18 hours. Subsequently, a material filtered through an 80 mesh sieve was dried and the weight (B) thereof was measured. A gel content was found according to an equation below.

Gel content=Weight of rubber polymer remaining after melting $(B)$/weight of initial rubber polymer $(A)$ Swelling index: Is an indirect index for crosslinking density of the present invention. In particular, in order to measure a gel content, the prepared rubber-ingredient solid content was stood in toluene for 18 hours and material (A) filtered through an 80 mesh sieve was dried. Subsequently, material (A) was stood in toluene as a solvent for 24 hours, and then, the weight (B) of swelled rubber resin was measured and a swelling index was found according to an equation below.

Swelling index=(Weight of swelled rubber resin $(B)$–weight of dried initial rubber resin $(A)$)/weight of dried initial rubber resin $(A)$ For reference, a product having a low swelling index exhibits a high crosslinking density, whereby impact strength of a subsequent impact and heat resistant resin composition is decreased (See Table 3 below). A product having a high swelling index exhibits enhanced impact strength.

TABLE 1

| Classification | | Examples 1 (A1) | Examples 2 (A2) | Examples 3 (A3) | Comparative Examples 1 (B1) | Comparative Examples 2 (B2) | Comparative Examples 3 (B3) |
|---|---|---|---|---|---|---|---|
| Monomer A (simultaneously input) | BD* | 50 | 50 | 50 | 65 | 50 | 50 |
| | AMS | 10 | 15 | 10 | | | |
| | AN | | | 5 | | | |
| | ST | | | | | | |
| | DVB | | | | | | 5 |
| Monomer B (continuously input) | BD | 40 | 35 | 35 | 35 | 35 | 45 |
| | AMS | | | | | | 15 |
| Total of monomers | | 100 | 100 | 100 | 100 | 100 | 100 |
| Conversion rate | % | 95 | 93 | 96 | 90 | 82 | 94 |
| Particle size | Å | 3200 | 3300 | 3100 | 3200 | 2900 | 3200 |
| Gel content | % | 73 | 70 | 75 | 85 | 82 | 95 |
| Swelling index | | 18 | 20 | 15 | 10 | 10 | 7 |

* ST: styrene, BD: 1,3-butadiene, AMS: α-methyl styrene.

As shown in Table 1, it can be confirmed that in Examples 1 to 3 in which latex A1 to latex A3 comprising the styrene derivatives are used, a rubber polymer having a low gel content and a high swelling index (accordingly, crosslinking density is low) without decrease of a polymerization conversion rate in the same polymerization time may be obtained, unlike Comparative Examples 1 to 3 in which latex B1 to B3 are used.

In particular, it can be confirmed that, in Comparative Example 3 in which a conventional crosslinking agent is added alone, a swelling index is rapidly decreased (accordingly, crosslinking density is high).

Graft Copolymer Preparation

Additional Example 1: Preparation of Graft Copolymer C1

Rubber prepared using latex (A1) of Example 1, monomer C of Table 2, 60 parts by weight of deionized water, and 0.2 parts by weight of alkenyl succinic acid potassium (product name: latemul ASK) were input to a reactor substituted with nitrogen and sufficiently stirred at 25° C. Subsequently, when temperature was elevated to 50° C., 0.08 parts by weight of tertiary butyl hydroperoxide, 0.003 parts by weight of ferric sulfate, 0.005 parts by weight of dextrose, 0.025 parts by weight of sodium pyrophosphate and 2.5 parts by weight of deionized water were added thereto, and reaction was carried out while elevating temperature to 65° C. over 30 minutes.

Here, a monomer corresponding to monomer D of Table 2 below was prepared into an emulsion with 0.3 parts by weight of alkenyl succinic acid potassium, 0.4 parts by weight of tertiary dodecyl mercaptan, 0.1 parts by weight of cumene hydro peroxide and 20 parts by weight of deionized, and was continuously input to a reactor for an hour and a half.

Subsequently, 0.05 parts by weight of cumene hydroperoxide, 0.003 parts by weight of ferrous sulfate, 0.005 parts by weight of dextrose, 0.025 parts by weight of sodium pyrophosphate and 2.5 parts by weight of deionized water were additionally added thereto, and polymerization temperature was elevated to 75° C. Reaction was maintained for one hour, and then, reaction was terminated. A latex composition and properties of the prepared graft copolymer were summarized in Table 2 below.

Additional Examples 2 to 4: Preparation of Graft Copolymers C2 to C4

The same process as in Additional Example 1 was repeated, except that contents and types of monomers C and D were substituted with those disclosed in Table 2 below. Here, polymerization conversion rates and properties thereof are summarized in Table 2 below.

Additional Comparative Examples 1 to 3: Preparation of Graft Copolymers D1 to D4

The same process as in Additional Example 1 was repeated, except that contents and types of monomers C and D were substituted with those disclosed in Table 2 below. Here, polymerization conversion rates and properties thereof are summarized in Table 2 below.

Property Measurement Method

Polymerization conversion rate: 2 g of the prepared latex at each step was dried in a 150° C. hot air dryer for 15 minutes and then the weight thereof was measured. A total solid content (TSC) was found and then a polymerization conversion rate was calculated as follows.

Polymerized solid: The latex prepared using emulsion polymerization was filtered through a 100 mesh sieve, and then a filtered polymer was dried for one hour in a 100° C. hot air dryer. Subsequently, the amount of the dried polymer was represented as a ratio relative to the theoretical total amount of added monomers and additives (emulsifier, etc.).

Graft ratio: 10 g of a graft copolymer powder was dried in a 60° C. oven and dehydrated. The weight (A) of the dehydrated copolymer was measured and the copolymer was stirred in 100 g of acetone as a solvent for 24 hours. Subsequently, a sol and a gel were separated at 10000 rpm in a centrifuge. Subsequently, the remainder which was not dissolved in acetone was dried in an oven, and the weight (B) of a resultant dry remainder was measured. A graft ratio was found according to an equation below.

Graft ratio=($B$−$A$*rubber content input in graft polymerization (%))/($A$*rubber content input in graft polymerization (%))

TABLE 2

| Classification | | Additional Examples | | | | Additional Comparative Examples | | | |
|---|---|---|---|---|---|---|---|---|---|
| | | 1 (C1) | 2 (C2) | 3 (C3) | 4 (C4) | 1 (D1) | 2 (D2) | 3 (D3) | 4 (D4) |
| Rubber | Types | A1 | A1 | A2 | A3 | B1 | B1 | B2 | B3 |
| | Content | 60 | 66.7 | 60 | 60 | 60 | 60 | 60 | 60 |
| Monomer (C) | AMS | 7 | 3.5 | 7 | 7 | 7 | 3.5 | 7 | 7 |
| | AN | 3 | 3 | 3 | 3 | 3 | 3 | 3 | 3 |
| | ST | | 3.5 | | | | 3.5 | | |
| Monomer (D) | AMS | 21 | 7 | 21 | 21 | 21 | 14 | 21 | 21 |
| | AN | 9 | 9 | 9 | 9 | 9 | 9 | 9 | 9 |
| | ST | | 7 | | | | 7 | | |
| Composition of copolymer | BD | 54 | 60 | 51 | 51 | 60 | 60 | 51 | 60 |
| | AMS | 34 | 17 | 37 | 34 | 28 | 17 | 37 | 28 |
| | AN | 12 | 12 | 12 | 15 | 12 | 12 | 12 | 12 |
| | ST | | 11 | | | | 11 | | |
| | Total | 100 | 100 | 100 | 100 | 100 | 100 | 100 | 100 |
| Conversion rate | % | 98.2 | 99.1 | 97.5 | 98.3 | 94.0 | 90.0 | 88.0 | 92.5 |
| Solid | % | 0.02 | 0.01 | 0.03 | 0.03 | 2.5 | 5.0 | 3.5 | 4.5 |
| G/R | % | 40 | 48 | 42 | 43 | 25 | 30 | 22 | 30 |

* G/R (Graft ratio)

As shown in Table 2, the graft copolymers of Additional Examples C1 to C4 based on Examples 1 to 3 in which latex A1 to A3 are used exhibit decreased gel content in the rubber particles, when compared with the graft copolymers of Additional Comparative Examples D1 to D4 based on Comparative Examples 1 to 3 in which latex B1 to B3 are used. In particular, when α-methyl styrene monomer is used in graft copolymerization, polymerization inside rubber particles may be more easily carried out, whereby high polymerization conversion rate may be accomplished in the same polymerization time and polymerization stability due to increased graft reaction efficiency may be secured.

Impact and Heat Resistant Resin Composition 2 parts by weight of sulfuric acid was added to the graft copolymerization latex according to each of Additional Examples 1 to 4 and Additional Comparative Examples 1 to 4, and was coagulated and washed. Subsequently, after performing hot-air-drying in a fluidized bed dryer, a powder was prepared. The powder was prepared into a pellet by kneading with heat resistant SAN (70 parts by weight of AMS monomer, 28 parts by weight of AN and 2 parts by weight of SM) prepared through solution polymerization, and then was injected, thereby preparing a specimen for property measurement.

Here, a rubber content of the prepared specimen was 16%, and properties thereof were measured and compared. Measured property values are summarized in Table 3 below.

Property Measurement Method

Izod impact strength: A specimen was prepared to a thickness of ¼", and an Izod impact strength thereof was measured according to ASTM D256. A unit was kg·cm/cm.

Environmental stress crack resistance (ESCR): A specimen for a tensile strength test prepared through injection-processing was located on a 1.0% jig, and then, 1 mg of a thinner was dropped onto the middle of each specimen. Subsequently, time taken until fractured was measured and recorded. Specimens which were not fractured after 10 minutes were represented as No Crack (NC).

Heat deflection temperature (HDT, ° C.): Heat deflection temperature was measured according to ASTM D-648.

TABLE 3

| Classification | | Additional Examples | | | | Additional Comparative Examples | | | |
|---|---|---|---|---|---|---|---|---|---|
| | | 1 (C1) | 2 (C2) | 3 (C3) | 4 (C4) | 1 (D1) | 2 (D2) | 3 (D3) | 4 (D4) |
| IMP (1/4") | Kgcm/cm | 27 | 25 | 24 | 24 | 15 | 12 | 10 | 10 |
| ESCR | Seconds | NB | 500 | 450 | NB | 45 | 30 | 25 | 20 |
| HDT | ° C. | 110 | 105 | 112 | 114 | 102 | 99 | 104 | 101 |

As shown in Table 3, it can be confirmed that, when the impact and heat resistant resin compositions comprising the graft copolymers according to Additional Examples 1 to 4 were used, impact strength, environmental stress crack resistance (ESCR) and heat deflection temperature (HDT) characteristics are enhanced, compared with the thermoplastic resin compositions comprising the graft copolymers according to Additional Comparative Examples 1 to 4. As shown in Table 1, this is caused by decreased crosslinking density of the rubber polymer.

In particular, it can be confirmed that, when the thermoplastic resin composition comprising the graft copolymer of Additional Comparative Example 4 is used, impact resistance-reinforcing effects of the rubber particle are decreased, compared to Additional Examples 1 to 4. Accordingly, impact resistance is decreased, heat deflection temperature does not increase, and environmental stress crack resistance (ESCR) is also decreased.

What is claimed is:

1. A rubber polymer that is an emulsion polymer of a diene-based monomer, the rubber polymer comprising a crosslinking regulator in an amount of 5% to 20% by weight based on 100% by weight in a total of monomers constituting the polymer,
   wherein the rubber polymer has a swelling index of 15 to less than 25 when the rubber polymer is exposed to toluene for 24 hours, and wherein the crosslinking regulator is a polymer of one or more unsaturated carboxylic acids selected from acrylic acid, maleic acid, methacrylic acid, itaconic acid and fumaric acid.

2. The rubber polymer according to claim 1, wherein the crosslinking regulator is a polymer of crosslinking control monomers.

3. The rubber polymer according to claim 1, wherein the rubber polymer has a gel content of 70% to less than 95%.

4. The rubber polymer according to claim 1, wherein the rubber polymer has a gel content of 70% to 75%.

5. An impact and heat resistant resin composition comprising a graft copolymer and a heat resistant thermoplastic resin, wherein a graft copolymer comprising the crosslinking regulator-comprising rubber polymer of claim 1 is comprised in an amount of 50% to 80% by weight based on 100% by weight of the composition.

6. The impact and heat resistant resin composition according to claim 5, wherein the heat resistant thermoplastic resin is one or more selected from an α-methylstyrene-acrylonitrile-styrene copolymer (AMS-SAN), an acrylonitrile-styrene copolymer (SAN), acrylonitrile-styrene-methyl methacrylate (MS), polycarbonate (PC), polybutylene terephthalate (PBT), and polyvinyl chloride (PVC).

7. The impact and heat resistant resin composition according to claim 6, wherein the heat resistant thermoplastic resin is comprised in an amount of 20% to 50% by weight based on the composition.

8. The impact and heat resistant resin composition according to claim 5, wherein the heat resistant thermoplastic resin is a polymer of 65 to 80% by weight of one or more styrene-based monomers selected from styrene, α-methylstyrene, α-methyl-4-butylstyrene, 4-phenyl styrene, 2,5-dimethyl styrene, 2-methylstyrene, α-methyl-3,5-di-t-butyl styrene, α-methyl-3,4,5-trim ethyl styrene, α-methyl-4-benzyl styrene and α-methyl-4-cyclohexyl styrene, and 20% to 35% by weight of one or more vinyl cyanide monomers selected from acrylonitrile, methacrylonitrile and ethacrylonitrile.

9. The impact and heat resistant resin composition according to claim 5, wherein the heat resistant thermoplastic resin is a polymer of one or more 64% to 75% by weight of styrene-based derivatives selected from α-methylstyrene, α-methyl-4-butylstyrene, 4-phenyl styrene, 2,5-dimethyl styrene, 2-methylstyrene, α-methyl-3,5-di-t-butylstyrene, α-methyl-3,4,5-trimethylstyrene, α-methyl-4-benzylstyrene and α-methyl-4-cyclohexylstyrene, 20% to 35% by weight one or more vinyl cyanide monomers selected from acrylonitrile, methacrylonitrile and ethacrylonitrile, and 1% to 5% by weight of styrene.

10. An impact and heat resistant resin composition comprising:
50% to 80% of a graft copolymer comprising:
50% to 80% by weight of a butadiene rubber polymer component comprising a crosslinking regulator in an amount of 5% to 20% by weight of the butadiene rubber polymer component and 20% to 50% by weight of one or more monomer selected from a styrene-based monomer, a vinyl cyanide monomer and a (methyl) acrylic acid ester monomer; and
20% to 50% of a heat resistant thermoplastic resin comprising an α-methylstyrene-acrylonitrile-styrene copolymer (AMS-SAN), an acrylonitrile-styrene copolymer (SAN), acrylonitrile-styrene-methyl methacrylate (MS), polycarbonate (PC), polybutylene terephthalate (PBT) or polyvinyl chloride (PVC),
wherein the crosslinking regulator is a polymer of one or more unsaturated carboxylic acids selected from acrylic acid, maleic acid, methacrylic acid, itaconic acid and fumaric acid.

* * * * *